Figures 1, 2:
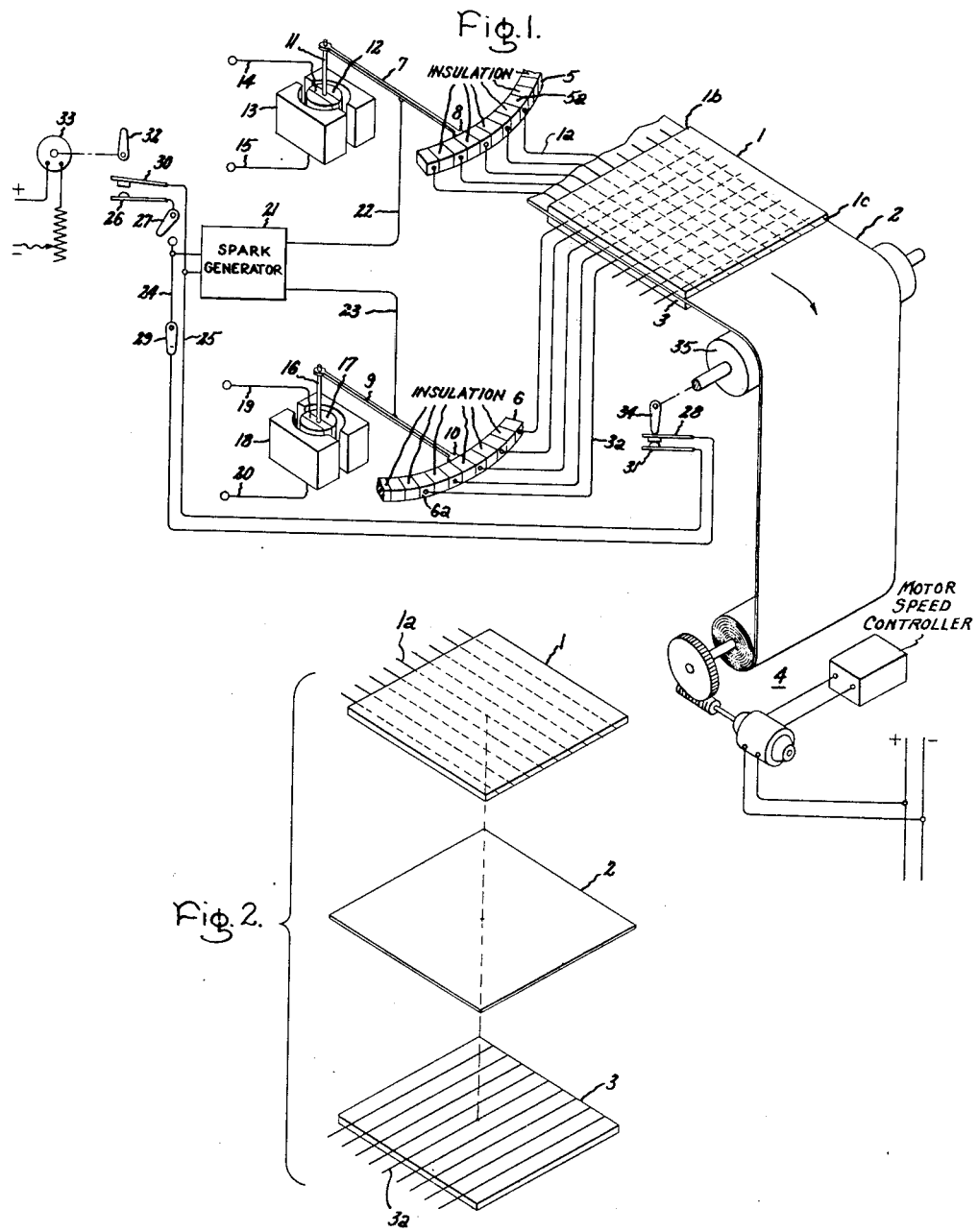

Inventors:
Louis G. Gitzendanner,
Daniel F. Langenwalter,
by Paul A. Franke
Their Attorney.

Patented Sept. 9, 1952

2,610,102

UNITED STATES PATENT OFFICE 2,610,102

FUNCTION RECORDER

Louis G. Gitzendanner and Daniel F. Langenwalter, Schenectady, N. Y., assignors to General Electric Company, a corporation of New York Application December 27, 1950, Serial No. 202,992

3 Claims. (Cl. 346—34)

Our invention relates to function recording devices, and more particularly to those function recording devices which record two related variable quantities.

The type function recorder in most common use at the present time is that in which one variable is plotted against time as a second variable. Although some function recorders do exist which plot the relationship of two variables other than time to each other, these true function recorders are specialized in their application. A well known example, for instance, is the steam engine chart recorder for plotting pressure-volume diagrams for steam engines.

It is an object, therefore, of this invention to provide a function recorder which is versatile in in its application for recording the simultaneous magnitude of two related variables other than time.

It is a further object of this invention to provide a function recorder which is versatile in its application for recording the simultaneous magnitudes of two related variables with respect to elapsed time.

In general, our new and improved function recorder comprises two crossed grids of parallel electrical conductors, the grids being separated by a dielectric material such for example as paper which will break down in response to a predetermined voltage. When an electrical impulse is applied between one of the conductors in one grid and one of the conductors in the other grid, an electrical discharge occurs between the two at the point where the conductors cross, piercing the paper and leaving a visible mark. The selection of the conductors to which the electrical impulse is made by suitable indicating mechanisms, the conductor energized in one grid being indicative of the magnitude of one variable, and the conductor energized in the other grid being indicative of the simultaneous magnitude of the related variable. The position of the resultant perforation is then a recording of the simultaneous values of the two related variables at the time of the electrical discharge.

For additional objects and advantages and for a better understanding of our invention, attention is now directed to the following description and accompanying drawing in which Fig. 1 is a schematic view of a recording system embodying our invention; and Fig. 2 is an exploded view of a portion of Fig. 1.

Referring to the drawing, a grid 1 composed of parallel conductors mounted on a supporting structure and electrically insulated from one another is separated by a strip of dielectric material such as paper 2 from a similar grid 3. Grids 1 and 3 lie in parallel planes, but the conductors of grid 3 extend perpendicular to the conductors of grid 1. Grids 1 and 3 when referred to collectively hereinafter will be called crossed grids. The strip of paper 2 is connected to a suitable mechanism 4 so that it can be made to move between the two grids at various constant rates in the direction indicated or can be left stationary at the discretion of an operator.

The conductors of grid 1 are connected to corresponding segments of commutator 5, each conductor being connected to a separate segment, as for example conductor 1a to segment 5a. The conductors of grid 3 are similarly connected to the segments of commutator 6, as for example conductor 3a to segment 6a. The segments of the commutators are insulated from each other.

Mounted on a movable arm 7 is a contact making point 8 which rides on commutator 5 and makes electrical contact with the segments thereof. A similar movable arm 9 has a contact making point 10 which rides on commutator 6. Contact making points 8 and 10 are of such width relative to the width of the commutator segments and the insulating strips therebetween that either contact point touches one and only one segment of its respective commutator at any one time. For best results the insulating strips separating the commutator segments are, as shown in Fig. 1, of the same width as the commutator segments themselves. In the particular system shown in Fig. 1, both moveable arms 7 and 9 are made of material having good electrical conductivity, such as iron or steel.

Movable arm 7 is pivoted on a shaft 11 which is attached to a rotor member 12 of an indicating device 13, such as for example a moving coil galvanometer. Shaft 11 is formed of electrically non-conducting material and insulates rotor 12 from movable arm 7. Indicating device 13 is connected by leads 14 and 15 to a source of electrical energy, from which it receives a signal voltage which is indicative of the magnitude of one of the related variables that it is desired to measure. For example leads 14 and 15 could be connected across a calibrated shunt if recordings of current fluctuations were desired.

Similarly, movable arm 9 is pivoted on shaft 16 which in turn is attached to the rotor 17 of another indicating device 18 which is structurally similar to indicating device 13. Shaft 16 like shaft 11 is composed of electrically non-conducting material. The indicating device 18 is connected by two leads 19 and 20 to a source of electrical energy from which it receives a signal voltage which is indicative of the magnitude of the other related variable that it is desired to measure. For example, if recordings of a voltage associated with the above-mentioned current fluctuations were desired, leads 19 and 20 could be connected to the voltage directly or through suitable transforming means.

Other devices such as mechanically or hydraulically actuated guages used for measuring temperatures and pressures may be substituted for the electrically actuated indicating devices 13 and 18 illustrated in Fig. 1.

An electrical impulse or spark generator 21 of variable frequency of discharge is connected to movable arms 7 and 9 by leads 22 and 23. The output of the spark generator 21 is controlled by lines 24 and 25, the generator producing a signal upon their being shorted. Line 24 is connected to contact 26 through switch 27 and to contact 28 through switch 29. Line 25 is connected directly to contacts 30 and 31.

The indicating devices 13 and 18 and their respectively associated commutators 5 and 6 constitute switching devices for respectively connecting the output leads 22 and 23 to conductors in the grids 1 and 3 corresponding to magnitudes of the variable quantities of which the positions of the arms 7 and 9 are indications.

Contacts 26 and 30 are closed momentarily by cam 32 as it rides once per revolution on the arm of contact 30. Cam 32 is mounted on the shaft of a variable speed motor 33.

Similarly, contacts 28 and 31 are closed momentarily by cam 34 as it rides once per revolution on the arm of contact 28. Cam 34 is mounted on the shaft of idler roller 35. The circumference of idler 35 is exactly equal to the distance that a point on paper 2 travels between edges 1b and 1c.

The operation of the system is as follows: the simultaneous magnitudes of two related variables being impressed by electrical signals on the indicating devices, the magnitudes of one variable on device 13 and the magnitudes of the other variable on device 18, rotor 12 assumes angular positions indicative of the signals impressed on device 13 and rotor 17 assumes angular positions indicative of the signals impressed on device 18. The angular positions of rotor 12 are transmitted through shaft 11 to movable arm 7, and the angular positions of rotor 17 are transmitted through shaft 16 to movable arm 9.

As arm 7 assumes these angular positions, contact point 8 rides along the commutator 5. The commutator segment that the contact 8 is touching at any instant is then indicative of the position of rotor 12 at that instant, and, therefore, is a measure of the magnitude of one of the related variables. Similarly as arm 9 assumes the angular positions of rotor 17, the segment of commutator 6 that contacts point 10 is touching at any instant is a measure of the simultaneous magnitude of the other related variable. There being but one conductor in grid 1 for each segment of commutator 5 and but one conductor in grid 3 for each segment of commutator 6, the conductors connected to the segments touched by the contact points 8 and 10 will also be indicative of the magnitudes of the related variables. In fact, the two crossed grids may be likened to an X—Y coordinate system, the conductors of one grid indicating the magnitudes of one variable as X quantities and the conductors of the other grid indicating the magnitudes of the related variables as Y quantities.

Since the output of the spark generator 21 is connected across the movable arms 7 and 9 by leads 22 and 23, the commutator segments which the contact points 8 and 10 are touching at that instant are energized upon an impulse being supplied by generator 21. The conductors connected to these segments are, of course, also energized. For example, if at the time an impulse is supplied from spark generator 21, contact 8 is touching commutator segment 5a and contact 10 is touching commutator segments 6a, then those segments are energized. Since conductor 1a of grid 1 is connected to commutator segment 5a and conductor 3a of grid 3 is connected to commutator segment 6a, the output voltage of spark generator 21 appears across conductors 1a and 3a. The voltage being of sufficient magnitude, the paper 2 separating conductor 1a from 3a breaks down at the point where they cross and an electric discharge occurs between the two conductors at that point. The electrical discharge or spark leaves a visible mark in paper 2.

Since crossed grids 1 and 3 form in a sense an X—Y coordinate system, the position of the mark left on the paper by the electrical discharge indicates the magnitude of both related variables at the instant of the electrical discharge.

To record the function between two related variables with respect to elapsed time paper 2 is made to move at a constant rate between grids 1 and 3. The frequency of discharge of the spark generator is correlated with the speed of movement of paper 2. In other words, the spark occurs only once for a given length of paper 2 passed between grids 1 and 3, this given length being the distance from edge 1b to edge 1c. This is done by closing switch 29 and opening switch 27 so that the spark generator is actuated by contacts 28 and 31, which in turn are closed by cam 34. The circumference of idler roller 35 being equal to the distance traveled by a point on paper 2 from the one edge of the grids to the other, i. e., edge 1b to edge 1c, and cam 34 being mounted on the idler shaft, contacts 28 and 31 are closed actuating the spark generator 21 once and only once for each of the successive sectional areas, which are equal in length to the distance between edges 1b and 1c. The record produced is obviously one with respect to particular instants of time. The frequency of discharge is very important because both time and magnitude of one variable are determined by the same coordinate. By using a frequency of discharge of the period specified, only one mark appears per given length of paper 2 and its position then indicates the magnitudes desired, time being determined by the frequency at which the marks occur. Thus assuming, merely for example, that it takes one second for the specified length of paper 2 to pass between the grids 1 and 3, the first mark would indicate zero time, the second mark one second later, the third mark two seconds after zero time, etc. The speed of movement of the paper 2 and thus the frequency of marking will depend upon the application for which it is desired to use the device.

For another important use, that of recording cyclical functions between two variables independently of time, the paper 2 is left stationary between grids 1 and 3 and the discharge of spark generator 21 is set at the frequency best suited for making sufficient marks to trace the outline of the function. The resulting plot shows the relationship of the two variables throughout the cycle no matter what the length of the cycle may be. For this application switch 27 is closed and switch 29 is opened. The spark generator 21 is then actuated by the closing of contacts 26 and 30 by cam 32. The desired frequency of discharge is obtained by varying the speed of motor 33.

The system has great versatility since it can be used for any application for which means exist to convert the magnitudes of the variable quantities to be recorded into electrical symbols.

Although in accordance with the provisions of the patent statutes, this invention is described as embodied in concrete form, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A function recorder for two related variable quantities comprising a first grid of parallel electrical conductors and a second grid of parallel electrical conductors positioned in adjacent parallel planes with the conductors of said first grid perpendicular to the conductors of said second grid; a sheet of dielectric material separating said grids, a spark generator provided with first and second output terminals, switching means responsive to one of said variable quantities for connecting the first of said terminals selectively to a conductor in the first of said grids corresponding to the magnitude of said one quantity, additional switching means responsive to the other of said quantities for connecting the second of said terminals selectively to a conductor in the second of said grids corresponding to the magnitude of said other quantity, and means for controlling said spark generator to effect intermittent discharge thereof, said spark generator having a voltage output sufficient to pierce said dielectric material at the point of crossing of said two perpendicular current-carrying grid conductors.

2. A function recorder for two related variable quantities comprising a first grid of parallel electrical conductors and a second grid of parallel electrical conductors positioned in adjacent parallel planes with the conductors of said second grid extending perpendicular to the conductors of said first grid; a length of dielectric material separating said grids; a spark generator provided with output terminals and having an output voltage sufficient to pierce said dielectric material; means to control the frequency of discharge of said spark generator; a first commutator and a second commutator each having a plurality of insulated segments; separate electrical connections from the conductors of said first grid to corresponding segments of said first commutator and from the conductors of the said second grid to corresponding segments of said second commutator; a first indicating device electrically connected to one of said output terminals and engaging said first commutator, said first device being movable across the segments thereof in response to the magnitude of one of said variable quantities; and a second indicating device electrically connected to the other of said output terminals and engaging said second commutator, said second device being movable across the segments thereof in response to the magnitude of the other of said quantities.

3. A function recorder for two related variables comprising a first grid of parallel electrical conductors and a second grid of parallel electrical conductors positioned in adjacent parallel planes with the conductors of said second grid extending perpendicular to the conductors of said first grid; a length of dielectric material separating said grids; means to move said dielectric material at predetermined rates between said grids; a spark generator provided with output terminals and having an output voltage sufficient to pierce said dielectric material; means to correlate the frequency of discharge of said spark generator with the rate of movement of said dielectric material; a first commutator and a second commutator each having a plurality of insulated segments; separate electrical connections from the conductors of said first grid to corresponding segments of said first commutator and from the conductors of said second grid to corresponding segments of said second commutator; a first indicating device provided with a contact in engagement with said first commutator and movable across the segments thereof in response to the magnitude of one of said variable quantities; a second indicating device provided with a contact in engagement with said second commutator and movable across the segments thereof in response to the magnitude of the other of said quantities; and separate electrical connections from each of said output terminals to a different one of said contacts whereby upon discharge of said spark generator said dielectric material is pierced at the point of crossing of the two of said grid conductors selected by said indicating devices.

LOUIS G. GITZENDANNER.
DANIEL F. LANGENWALTER.

REFERENCES CITED

The following references are of record in the file of this patent:

UNITED STATES PATENTS

| Number | Name | Date |
|---|---|---|
| 907,235 | Herrick | Dec. 22, 1908 |
| 2,467,202 | Gardiner | Apr. 12, 1949 |